United States Patent
Zinn

[15] 3,676,567
[45] July 11, 1972

[54] APPARATUS FOR USE IN TESTING FOR THE PRESENCE OF A GIVEN VOLTAGE WITH RESPECT TO GROUND ON A PIPELINE

[72] Inventor: Frank R. Zinn, Culpeper, Va.
[73] Assignee: Bingham & Taylor, Culpeper, Va.
[22] Filed: Aug. 16, 1971
[21] Appl. No.: 172,116

[52] U.S. Cl..............................................174/37, 174/66
[51] Int. Cl..........................................H02g 9/00, C23f 13/00
[58] Field of Search...................174/1, 6, 18, 37, 38, 39, 66, 174/67, 75 B; 339/36, 123

[56] References Cited

UNITED STATES PATENTS 3,055,970   9/1962   Handley...................................174/37

Primary Examiner—Laramie E. Askin
Attorney—Cushman, Darby & Cushman

[57] ABSTRACT

An apparatus for use in testing for the presence of a given voltage with respect to ground on a pipeline or the like whereby, in place of the conventional cover plate for the test station tube which houses the wires which connect to ground and the pipeline respectively and which must be removed to electrically connect a voltmeter to the wires, a cover having at least two passages through it with an electrically insulating plug disposed in each passage is employed. For testing two or more pipelines lying close together, the cover can be provided with a set of two apertures for each pipeline to be tested. Each plug has an internal space which is communicated to the interior of the test tube by at least a single opening through which a wire passes so that an uninsulated portion thereof is disposed within the interior space. A further opening communicates the internal space to the open air so that a voltmeter can be connected to both wires without removing the cover plate. If desired, a further opening between the internal space and the interior of the test tube can be employed for draining the space.

10 Claims, 3 Drawing Figures

PATENTED JUL 11 1972
3,676,567
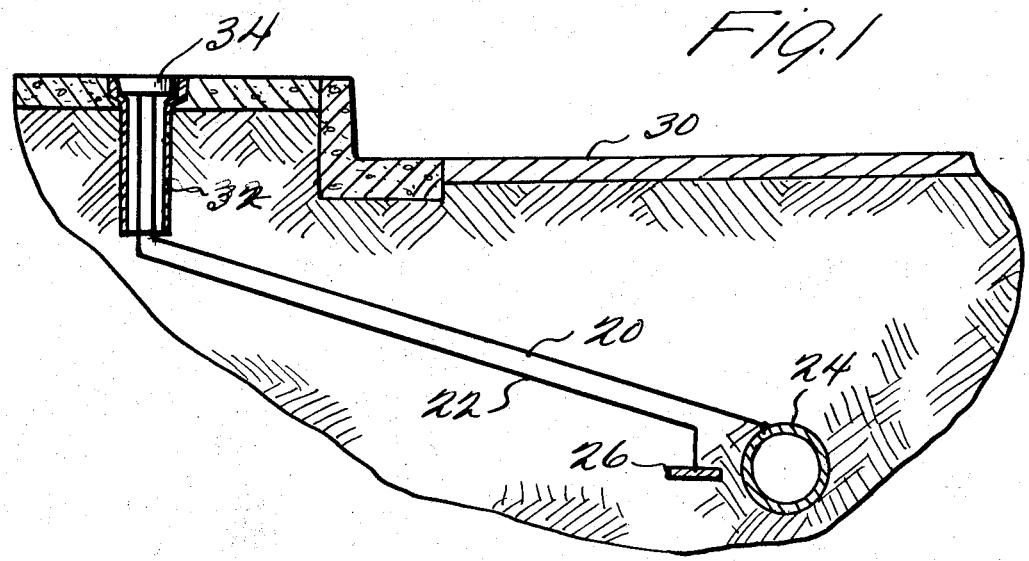
Fig.1
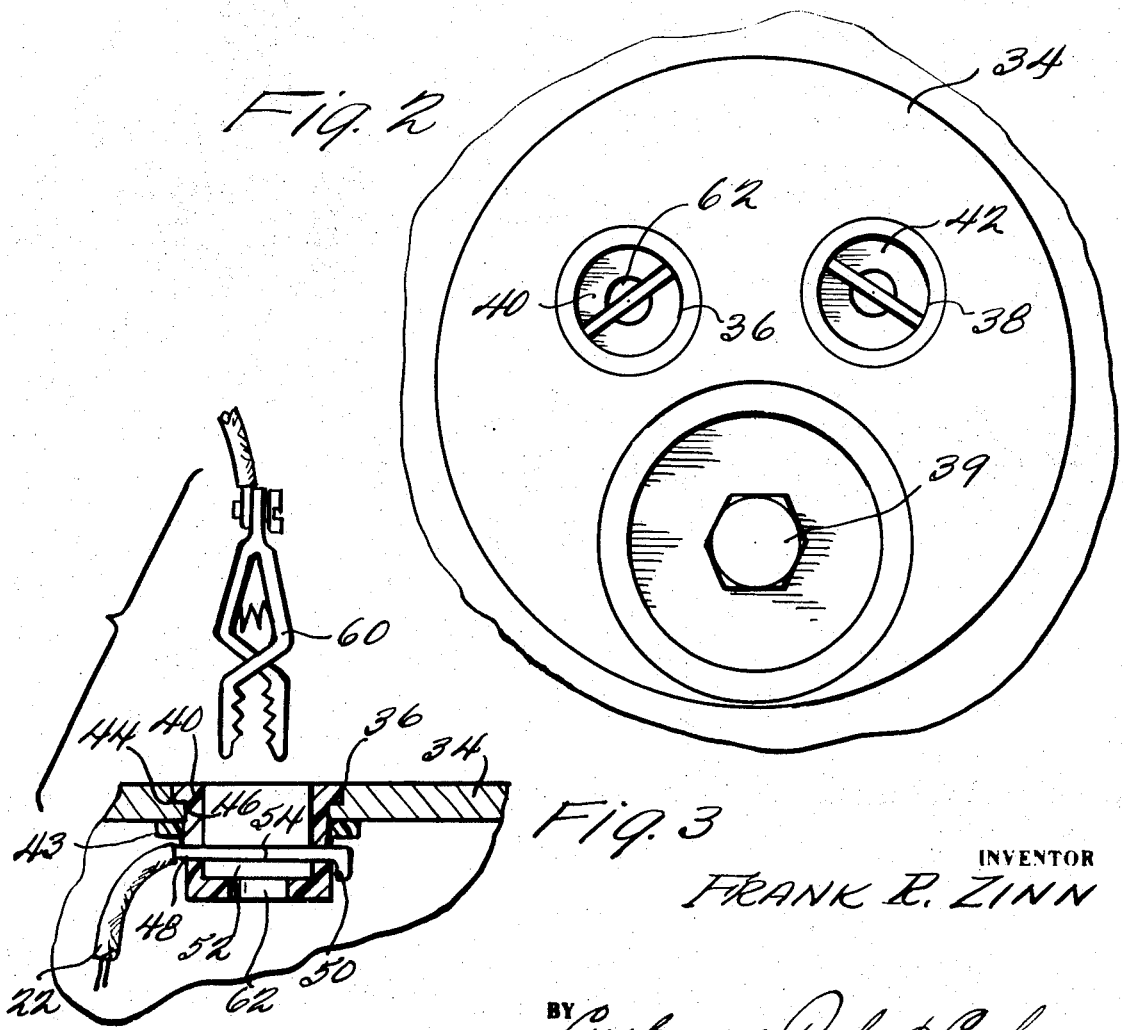
Fig.2
Fig.3
INVENTOR
FRANK R. ZINN
BY Cushman, Darby & Cushman
ATTORNEYS

APPARATUS FOR USE IN TESTING FOR THE PRESENCE OF A GIVEN VOLTAGE WITH RESPECT TO GROUND ON A PIPELINE

BRIEF DESCRIPTION OF THE PRIOR ART AND SUMMARY OF THE INVENTION

The invention relates to an apparatus for testing for the presence of a given voltage with respect to ground on a pipeline or the like.

Gas pipelines are conventionally protected against electrochemical deterioration by maintaining a low D.C. voltage, usually about 2 volts with respect to ground, on the pipeline. Presently, sets of two wires, one welded to the pipeline and the other to a ground bar, are run at periodic intervals to test stations at which the presence of a correct voltage on the pipeline can be checked. In such an arrangement, the pipeline functions as an anode and the ground bar as a cathode so that it is the ground bar, which can be replaced as needed, which deteriorates rather than the pipeline.

Each such station normally includes a hollow test tube with an end opening into the air and extending down into the ground with the wires passing up the hollow tube to a location near the open end. A metal cover is fastened on the open end to protect the wires against weather and the like and must be removed to attach voltmeter leads to the two wires within the test tube. The necessity to remove the cover to obtain access to the wires makes the testing operation lengthy and cumbersome. One such device is shown, for example, in the U.S. Pat. to Handley, No. 3,055,970.

The present invention relates to a simple and inexpensive apparatus whereby voltmeter leads can be connected to such wires without removing the tube cover, while at the same time adequately protecting the wires against normal damage from weather and the like. This is accomplished by an apparatus which includes a cover which is similar to covers conventionally used except that two passages are provided through it. A plastic insulating plug having an interior space is disposed in each passage and held in place, for example, by a washer shrunk around it. One of the wires passes from the interior of the test tube into the interior space so that an uninsulated portion is disposed within that interior space. Preferably, the bare wire end passes in one side of and out the other side of the plug and is then bent about the plug to hold the wire in place. A further opening communicates the interior space of the plug to the open air so that the meter leads can be simply, quickly and easily clipped to the two bare wires through the further opening in each plug. Yet another opening is preferably provided between the interior space in each plug and the interior of the tube for draining the interior space. To check two or more pipelines running side by side, a pair of plugs for each pipeline can be disposed in the cover.

Many other objects and purposes of the invention will be clear from the following detailed description of the drawings.

BRIEF DESCRIPTION OF THE DRAWINGS

FIG. 1 shows a schematic view of the testing apparatus of this invention attached to a pipeline and ground bar;

FIG. 2 shows a top view of the cover of the apparatus of FIG. 1;

FIG. 3 shows a cut-away view of one of the plugs in the cover of FIG. 1.

DETAILED DESCRIPTION OF THE DRAWINGS

Reference is now made to FIG. 1 which shows wires 20 and 22 conventionally welded to a pipeline 24, which functions as an anode, and a ground bar 26, which functions as a cathode. No. 12 solid conductor, insulated wire has been found quite satisfactory. As discussed above, a small voltage, e.g., 2 volts, is conventionally maintained between pipeline 24 and ground to prevent electrochemical deterioration of the pipeline and accordingly this same voltage exists between wires 20 and 22.

Pipeline 24 in FIG. 1 is buried beneath roadway 30 and wires 20 and 22 lead from pipeline 24 through the ground and up to the surface, for example, a sidewalk. A test station tube 32, which is simply a cylindrical tube open at both ends with one end at the surface and the other extending down into the ground, contains wires 20 and 22 as they approach the surface. In a conventional apparatus, such a tube would be capped by a solid cover which would be removed each time the voltage on the pipeline had to be checked.

However, cover 34 which caps the end of tube 32 at the surface is not solid but has two or more separated passages 36 and 38 extending through it. For testing more than one pipeline, a pair of apertures is preferably provided for each pipeline. Cover 34 may be conventional cast iron or other material and may be fixed to tube 32 by any suitable means such as bolt 39. Cover 34 can be permanently attached to tube 32, if desired, since it need not be removed to test for a given voltage on pipeline 24.

Two identical plugs 40 and 42 extend through and are fixed in place in passages 36 and 38, respectively. These plugs are preferably comprised of an electrically insulating material such as plastic. As can be seen in FIG. 3, the tops of plugs 40 and 42 preferably are flush with the surface of cover 34. A washer 43, preferably shrunk onto plug 40 prevents plug 40 from moving upward, and downward movement of plug 38 is precluded by a shoulder 44 on plug 38 which takes the form of a ring and which abuts annular recessed surface 46 of cover 34.

Opposed openings 48 and 50 communicate an interior space 52 within plug 38 to the interior of tube 32 so that the bare end 54 of wire 22 can pass into space 52 through one aperture and out the other leaving an uninsulated portion of wire 22 within space 52. The end 54 can then be bent about plug 38 to hold the wire firmly and securely in place. Wire 20 is similarly secured in plug 42.

A further opening communicates space 52 to the open air above cover 34 so that a voltmeter lead clip, such as clip 60, can be easily clipped to a bare portion of wire 54 without removing cover 34. Yet another opening 62 between space 52 and the interior of tube 32 is also preferably provided to drain space 52.

Many changes and modifications in the above embodiments of the invention can, of course, be made without departing from the scope of the invention and, accordingly, that scope is intended to be limited only by the scope of the appended claims.

What is claimed is:

1. Apparatus for use in testing for the presence of a given voltage with respect to ground on a pipeline or the like comprising:

a cover fitting onto an end of a hollow test station tube having an end opening into the air and extending from the air into the ground and which contains first and second electrical wires, one connected to ground and the other to said pipeline, said cover having first and second passages extending through it and, first and second electrically insulating plug members each disposed in one of said passages, and each having an internal space with at least a first opening between said internal space and the interior of said tube through which one of said wires passes so that an uninsulated portion thereof is situated in said internal space, and a second opening communicating said internal space to the exterior of said tube above the ground for permitting access to said uninsulated portions of said wires to test for the presence of said given voltage with respect to ground on said pipeline.

2. Apparatus as in claim 1 wherein said plug members are plastic.

3. Apparatus as in claim 1 wherein each said plug member has a further opening communicating said internal space with the interior of said tube for draining said interior space.

4. Apparatus as in claim 1 wherein each said plug member has a further opening receiving said wire received by the first opening of that plug member so that said wire passes into said internal space via said first opening and leaves via said further opening with said uninsulated portion within said internal space.

5. Apparatus as in claim 4 wherein said cover has a recessed annular shoulder about each said passage and each said plug member has a shoulder abutting said annular shoulder and further including a washer about each of said plugs engaging the lower surface of said cover.

6. Apparatus for testing for the presence of a given voltage with respect to ground on a pipeline or the like comprising:
 first and second wires, one connected to said pipeline and the other connected to ground,
 a test station tube having an end opening into the air and extending from the air into the ground and containing said wires,
 a cover fitting onto said end of said tube opening into the air and having first and second passages extending through it, and
 first and second electrically insulating plug members each disposed in one of said passages and each having an internal space with at least a first opening between said internal space and the interior of said tube through which one of said wires passes into said internal space so that an uninsulated portion thereof is situated in said internal space and a second opening communicating said internal space to the air for permitting access to said uninsulated portions of said wires to test for the presence of said given voltage with respect to ground on said pipeline.

7. Apparatus as in claim 6 wherein said plug members are plastic.

8. Apparatus as in claim 6 wherein each said plug member has a further opening communicating said internal space with the interior of said tube for draining said interior space.

9. Apparatus as in claim 6 wherein each said plug member has a further opening receiving said wire received by the first opening of that plug member so that said wire passes into said internal space via said first opening and leaves via said further opening with said uninsulated portion within said internal space.

10. Apparatus as in claim 6 wherein said cover has a recessed annular shoulder about each said passage and each said plug member has a shoulder abutting said annular shoulder and further including a washer about each of said plugs engaging the lower surface of said cover.

* * * * *